UNITED STATES PATENT OFFICE 2,612,496

ACID AZO DYES

Bela Gaspar, Beverly Hills, and Paul Daniel Dreyfuss, Van Nuys, Calif., assignors, by mesne assignments, to said Gaspar No Drawing. Application April 2, 1948, Serial No. 18,713

10 Claims. (Cl. 260—166)

This invention relates to dyes and more particularly to blue and blue-green disazo dyes and methods for their production. The object of this invention is to produce blue and blue-green dyes which have exceedingly brilliant shades. A further object is to produce dyes which are useful for photographic purposes and in the dyeing of vegetable and animal fiber, of organic colloids, and of other matter.

The new dyes have the following general formula

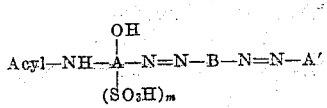

wherein B is a monocyclic or polycyclic aromatic residue containing the azo bonds shown in 1,4-position, A is the residue of naphthalene, the OH group shown stands in ortho position to the azo group linked to said naphthalene residue, $m$ stands for one of the integers 1 and 2, acyl stands for the residue of a carboxylic or sulfonic acid, and A' stands for the residue of an azo coupler containing a hydroxyl group in 2 or 4 position to the azo group linked to said azo coupler.

A survey of the heretofore known azo dyes shows that the number of brilliant azo dyes which absorb the blue or the green light is quite large but that there are only a very limited number of brilliant azo dyes which absorb in the longer wave range of the visible spectrum. Most of the dyes which absorb in the longer wave range are found in the group of the tris and tetrakis azo dyes. The accumulation of three or four azo groups in one molecule has in most cases the consequence that besides a shift of the absorption maximum to longer wave lengths, the absorption band is broader, that is, the dye becomes dull or blackish. Azo dyes, absorbing in the red end of the spectrum and having good transmission in the blue and green sections of the spectrum are very rare. It is common practice, therefore, to produce green and greenish-blue shades by using a mixture of yellow and blue dyes. This procedure, however, has many disadvantages.

It is remarkable that dyes of the general formula above prove to be brilliant and stable dyes. They are exceptionally bright and of a great brilliance of hue, and their absorption curves have a very steep increment. A large number of blue-green azo dyes, which appear quite brilliant in daylight, appear dull in artificial light. Quite differently, the dyes of this invention are very brilliant, even in artificial light. The unexpected spectral characteristics of the dyes of the general formula above supposedly are due to the presence of the resonance system

where X stands for 1 or 2 and where Y is part of a naphthalene nucleus containing an acylamino residue. It is particularly surprising that the disazo dyes of the above general formula absorb, in spite of their comparatively simple structure, in the far red end of the visible spectrum and that it is possible, therefore, to produce brilliant dyes in this class with a pronounced greenish shade. As the new dyes as a class permit many possibilities of variation, they can be applied wherever sulfonated dyes are useful. Their affinity for all kind of fibers, their penetrative capacity in colloids, their fastness to diffusion in photographic colloids, their solubility, the accessibility to bleaching in photographic processes, their capacity to dye evenly, their fastness to washing and ironing, their shade and other desirable qualities can be varied within wide limits by changing the number and position of the sulfonic acid groups in the dyestuff molecule, by modifying the acyl substituent in the aminonaphthol residue, by substituents in the radical B, by variations in the azo coupler A' and by linking two or more dye units by means of external bonds in a manner which will be explained further on.

Our new dyes are not only simple in their chemical structure but their method of preparation is equally simple. Only a few steps are required to transform commonly available starting materials into our valuable dyes, and a purification of the dyes is unnecessary in most cases because of a striking difference in affinity of the disazo dyes to the fiber compared with the by-products formed in their synthesis.

The dyes can be prepared according to one of the following four methods:

1. One mol of a para-tetrazo compound is coupled with two mols of a sulfonated N-acylaminonaphthol.

2. One mole of a para-amino diazo compound is coupled with one mol of a sulfonated N-acylaminonaphthol. The resulting amino-azo dye is diazotised and coupled with the second azo coupler.

3. One mol of a para-acylamino diazo compound is coupled with one mol of a sulfonated N-acylaminonaphthol. The acyl group which was introduced into the amino diazo compound is removed by hydrolysis, and the resulting amino azo dye is diazotised and coupled with one mol of a second azo coupler.

4. The amino azo dye used as intermediate in the methods 2 and 3 can be prepared by coupling one mol of a para-nitro diazo compound with one mol of a sulfonated N-acylaminonaphthol and by reduction of the resulting azo dye.

The first and second methods are suitable only in special cases; the third and fourth methods are of general applicability.

In many cases it is preferable to change the sequence of couplings, that is, to prepare first the amino azo dye containing a suitable azo coupler residue and to couple this monoazo dye with one mol of a sulfonated N-acylaminonaphthol. In other cases it is convenient to replace the sulfonated N-acylaminonaphthol with a sulfonated aminonaphthol which is coupled in alkaline solution. In this case the resulting diazo dye is acylated by the action of a suitable acid chloride or anhydride.

Among the diazo or tetrazo compounds suitable for use in the production of the dye which we propose to use, we may mention those obtained from the following amines:

1,4-phenylenediamine
5-nitro-2-amino-p-xylene
2,6-dichloro-4-nitraniline
3-bromo-5-nitro-2-aminotoluene
4-acetylaminoaniline-2-sulfonic acid
4-nitraniline-2-diethylsulfonamide
5-nitro-2-aminobenzylsulfonic acid
1,4-naphthylenediamine-2-sulfonic acid
4-nitro-1-naphthylamine-6-sulfonic acid
5-nitroanthranilic acid
Ethyl-(5-nitro-2-aminophenyl)-sulfone
4-acetylamino-5-methoxyaniline-2-sulfonic acid
2-benzyloxy-5-chloro-4-nitraniline
4-nitraniline-2-oxyacetic acid, its esters such as the n-butyl, benzyl, cholesteryl and triethylene glycol esters, and its amides such as the N-ethyl anilide and N-(4'-nitraniline-2'-oxyacetyl)-carbazole-3,6-disulfonic acid
2,5-dimethoxy-4-nitraniline
4-oxylamino-2,5-di-(2'-hydroxyethoxy)-aniline, its esters and ethers such as its mono ester with phthalic acid and 4-oxalylamino-2,5-di-(9'-hydroxy-1',4',7'-trisoxa-n-nonyl)-aniline
1-oxalylamino-2-ethoxy-4-naphthylamine-7-sulfonic acid
2-amino-5-nitrodiphenyl ether Among the N-acylaminonaphthol sulfonic acids suitable for coupling, we mention those derived from J, gamma, H, M, S, B, K, sulfo-J, RR, and all of the other aminonaphtholsulfonic and disulfonic acids which are capable of coupling with diazo compounds in ortho position to the OH group. The amino group of these acids may be acylated with mono or polycarboxylic acids, or mono or polysulfonic acids, of the aliphatic or aromatic series, and these acid radicals may contain further substituents. A few items are listed to illustrate the scope of possible variations:

Caproyl-H-acid
Naphthylene-1,5-disulfo-K-acid
Carbonyl-bis-J-acid
Adipyl-mono-H-acid
Sebacyl-bis-H-acid
(m-Aminobenzenesulfo)-S-acid
p-Oxybenzoyl-gamma-acid
Phthalyl-RR-acid
5-chloronicotinyl-K-acid These acylated aminonaphthol sulfonic acids may be replaced by other components, which are obtained by reacting aminonaphthol sulfonic acids with compounds such as cyanuric chloride, methyldichloropyrimidine, αγ-dichloroquinoline, 1,4-dichlorophthalazine, dichlorobenzguanamide and 2-chloroquinoxaline-6-carbochloride. The compound 2,4-dianilino-6-N-(1'-amino-3',6'-disulfo-8'-naphthol)-1,3,5-triazine is a suitable coupling component within the scope of the present invention. The term "acyl residue" in the appended claims, therefore, has to be understood to comprise the residues of organic acidic substances which, when bound to the nitrogen of an aminonaphthol, are regarded in the art of dye chemistry as equivalents for the residues of carboxylic or sulfonic acids.

Those acid radicals containing reactive groups can be reacted further. Sometimes it is necessary to protect reactive groups in the acid radicals of the first azo coupling component for the time of the second coupling or to reverse the sequence of coupling operations, e. g., the (m-aminobenzenesulfo)-S-acid, mentioned above, can be used only in a reversed coupling sequence or after suitable protection of the amino group.

The acylated derivatives of aminonaphthol mono- and disulfonic acids, described as first azo coupling components, may be used as second azo coupling components as well. This leads to a group of azo dyes which are particularly valuable and which have the general formula

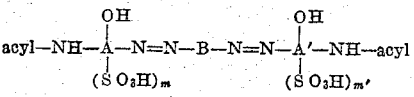

where both of the acylaminonaphtholsulfonic acid residues may be identical or not.

Other suitable second azo coupling components are the (non-acylated) aminonaphthol mono- and disulfonic acids themselves and their N-alkyl and N-aryl derivatives such as ethyl-H-acid, benzyl-H-acid and phenyl-J-acid, which are capable of coupling with diazo compounds in ortho position to the OH group. Among further azo coupling components suitable for the second coupling we may mention the following:

8-chloro-1-hydroxynaphthalene-3,6-disulfonic acid
Chromotropic acid
Chromotropic acid mono ethyl ether
1-naphthol-7-sulfonic acid
R-acid
1-(4-sulfophenyl)-pyrazolone-(5)-3-carbonic acid (tartrazinogenic acid)
5-aminophenol-2-sulfonic acid
3-benzolyaminophenol
1-acetylamino-5-naphthol
Alpha naphthol
Beta naphthol
1-phenyl-3-methyl-5-pyrazolone
1-methyl-2,4-dioxo-1,2,3,4-tetrahydroquinoline
Acetoacet-o-chloroanilide Those azo dyes containing a polyfunctional middle component, e. g., ethyleneglycol-bis[2(or 5)-amino-5(or 2)nitro-4-ethoxy-phenyl]-ether and/or one or two polyfunctional azo coupling components, e. g., sebacyl-bis-H-acid, are dyes of high molecular weight containing the dye unit several times in their molecule. The general formula for this group of dyes is

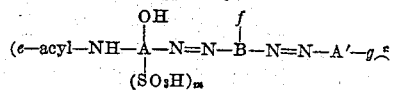

where the symbols A, A', B, m and acyl are those explained above, where e, f and g represent hydrogen or external linkages, and where n stands for an integer. These dyes have the same shade as the corresponding unlinked "monomeric" dyes but different physical properties. Most of them are very soluble in water.

The preferred method of preparation for dyes of this group is to produce first monomeric dyes having reactive terminal groups, e. g., an amino group in the acyl residue linked to the amino naphthol sulfonic acid and/or in the middle component B and/or in the second azo coupling component A', or other reactive terminal groups such as carboxyl or alcoholic or ethylene groups in any one of these nuclei. The finished "monomeric" disazo dye is treated with suitable reagents such as phosgene to produce external linkages. Suitable external linnkages are: —CO—, —CS—, —, —CX$_2$— (where X is hydrogen, alkyl or aryl), —SO$_2$—, —S—, —NX—, —O—, —R— (where R is a bivalent hydrocarbon residue), —NH—CO—NH—, —NH—CS—NH— —NH—R—NH—, —NH—SO$_2$—R—SO$_2$—NH— —NH—CO—R—CO—NH—, —O—P(OH)—O— —SO$_2$NH—, —R—O—, —NH—CO— and the like. Some of these linkages such as —SO$_2$— are preferably present in the starting materials from which the dyes are prepared, whereas other linkages such as —NH—CO—NH— are introduced into monomeric dyes in the above described manner. These methods are disclosed in detail in U. S. Patent No. 2,470,769.

By way of example, but not in limitation, the following illustrate specifically our new dyes and some of the processes for obtaining the same.

*Example 1*

The dye

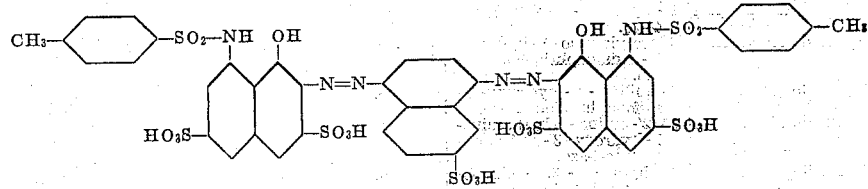

is prepared in the following way: 4-nitro-1-napthylamine-6-sulfonic acid is diazotised and coupled with toluenesulfo-H-acid. The azo dye thus obtained is dissolved in an excess of sodium hydroxide and stirred at 60° C. with sodium sulfide, until the color of the solution, which is violet blue at the beginning turns orange. Thereupon the solution is buffered with sodium bicarbonate, the intermediate dye is precipitated by the addition of sodium chloride, isolated by filtration and washed. The azo dye is diazotized in known manner and the diazo solution is added at −5° C. to a stirred solution of toluenesulfo-H-acid in aqueous pyridine. After three hours, the solution is acidified and precipitated with sodium chloride. By washing with sodium chloride solution or by reprecipitating with sodium chloride from the aqueous solution the dye is freed from purple impurities.

The dye is quite soluble in water and dyes wool and silk in blue-green shades. A dry gelatin film, containing this dye, has a sharp maximum of absorption at about 660 mu.

*Example 2*

The dye

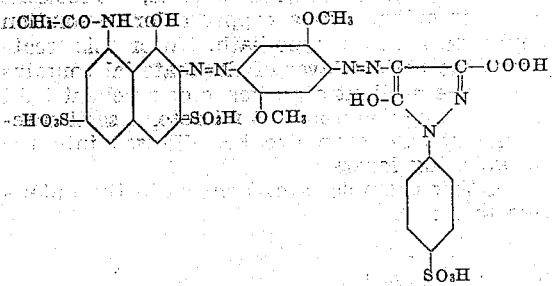

is prepared by coupling 2-amino-5-nitro-hydroquinonedimethyl ether with acetyl-H-acid, by reducing the dye thus obtained and by coupling the intermediate dye with sulfophenylpyrazolonecarbonic acid (tartrazinogenic sulfonic acid). A very brilliant blue-green dye is obtained.

Dyes of practically the same shade are obtained if the middle component is replaced by 4-nitraniline-2,5-dioxyacetic acid-di-ethylether or if the acetyl-H-acid is replaced by (3-acetyl-aminobenzenesulfo)-H-acid. Furthermore, one mol of the tartrazinogenic acid in the above example can be replaced by one-half mol of 1,1'-[2,2'-disulfodiphenylene-(4,4')]-bis-[pyrazolone-(5)-3-carbonic acid].

The dyes, containing an acyl-S-acid or an acyl-K-acid instead of the acetyl-H-acid, have practically the same shade, but the replacement of these components with acetyl-J-acid yields a somewhat less greenish blue-green dye.

Those dyes containing a second azo coupler free from solubilizing groups are in most cases difficulty soluble in water. The color of the dyeings with these difficulty soluble dyes depends on the chemical character of the substrate; e. g., a dry photographic gelatin containing a difficulty soluble dye of this class may have a dull purple color which changes to blue-green by hardening the gelatin with formaldehyde or by adding an ester or a glycol such as cellulose glycolic acid, partially saponified acetyl cellulose or "Carbowax 4000" (a mixture of polyethylene glycols having the average molecular weight of 4000) to the gelatin.

*Example 3*

12 ml. of a 2% solution of the dye

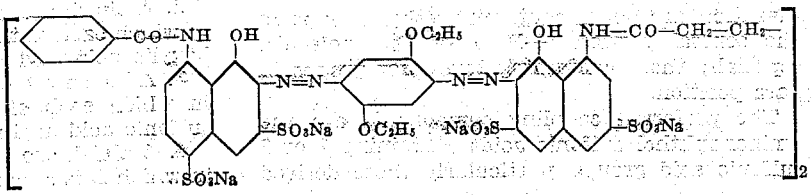

are added to 100 ml. of a red sensitized silver bromide emulsion. This emulsion is coated on a support, and the coating is used for the bottom layer of a multilayer material. The material is exposed and developed in known manner, the dye is destroyed at the places where metallic silver is present, e. g., in a hydrobromic acid bath containing 2,3-dimethylquinoxaline, the metallic silver is oxidized in a copper chloride solution and removed in a hypo bath. After this treatment the bottom layer of the material contains a positive brilliant cyan image of excellent light fastness and definition. A microtome section reveals that no cyan dye has diffused into the neighboring layers.

Further examples are arranged in the following table:

from 1,8 aminonaphthol such as H and K acids. At least one of such coupling components is acylated by a carboxylic or sulfonic acid at the amino group, those acylated with a carboxylic acid being preferable. The dyes of this group have excellent spectral characteristics and do not diffuse or desensitize a photographic emulsion, and furthermore, give colorless reduction products in dye bleaching processes of color photography.

Since from the foregoing description of the invention it will be apparent to those skilled in the art that many variations of this invention may be made without departing from the spirit and scope thereof, it is to be understood that we do not limit ourselves to the specific examples thereof except as defined in the appended claims.

| No. | A—N=N— | —B— | —N=N—A' | Color |
|---|---|---|---|---|
| 1 | 8-p-toluenesulfonylamino-1-hydroxy-3,6-disulfonaphthalene-2-azo. | 1,4-phenylene | 8-p-toluenesulfonylamino-1-hydroxy-3,6-disulfonaphthalene-2-azo. | blue. |
| 2 | ----do---- | ----do---- | 8-amino-1-hydroxy-5-sulfonaphthalene-2-azo. | Do. |
| 3 | ----do---- | ----do---- | 6-amino-1-hydroxy-3-sulfo-5-(2',5'-dichlorophenyl-azo) naphthalene-2-azo. | Do. |
| 4 | ----do---- | 2,6-dichloro-1,4-phenylene. | 8-p-toluenesulfonyl-amino-1-hydroxy-3,6-disulfonaphthalene-2-azo. | blue-violet. |
| 5 | ----do---- | 1,4-phenylene-2-oxyacetic acid. | ----do---- | blue-green. |
| 6 | ----do---- | 2,5-dimethoxy-1,4-phenylene. | 1-hydroxy-8-chloro-3,6-disulfonaphthalene-2-azo. | Do. |
| 7 | ----do---- | ----do---- | 2-hydroxy-naphthalene-1-azo. | Do. |
| 8 | ----do---- | ----do---- | 1-methyl-2,4-dioxo-1,2,3,4-tetrahydroquinoline-3-azo. | Do. |
| 9 | ----do---- | ----do---- | acetoacet-o-chloroanilide beta-azo. | Do. |
| 10 | 8-acetylamino-1-hydroxy-5-sulfonaphthalene-2-azo. | ----do---- | 3-benzoylamino-1-hydroxy-phenyl-4-azo. | Do. |
| 11 | ----do---- | ----do---- | 1-phenyl-3-methyl-5-pyrazolone-4-azo. | Do. |
| 12 | ----do---- | ----do---- | 1-hydroxy-naphthalene-4-azo. | Do. |
| 13 | ----do---- | ----do---- | 8-acetylamino-1-hydroxy-5-sulfonaphthalene-2-azo. | Do. |
| 14 | ----do---- | ----do---- | 6-anilino-1-hydroxy-3-sulfonaphthalene-2-azo. | Do. |
| 15 | ----do---- | ----do---- | 7-(2'-amino-ethyl)-amino-1-hydroxy-3-sulfonaphthalene-2-azo. | Do. |
| 16 | ----do---- | ----do---- | 2-hydroxy-3,6-disulfonaphthalene-1-azo. | Do. |
| 17 | 6-acetylamino-1-hydroxy-naphthalene-3-sulfo-2-azo. | ----do---- | 6-acetylamino-1-hydroxy-3-sulfonaphthalene-2-azo. | Do. |
| 18 | ----do---- | ----do---- | 8-amino-1-hydroxy-5,7-disulfonaphthalene-2-azo. | Do. |
| 19 | ----do---- | ----do---- | 6-amino-1-hydroxy-3-sulfo-naphthalene-2-azo. | Do. |

The blue and blue-green dyes, described and exemplified above, have an unusual brilliancy. Their fastness to light depends mainly on the acyl residue attached to the aminonaphthol sulfonic acid. Whereas, e. g., the fastness of the dye obtained by coupling tetrahydroquinone dimethyl ether with toluenesulfo-H-acid, is not sufficient for all purposes, the dye obtained by coupling tetrahydroquinone dimethyl ether with 2,4-dichlorobenzoyl-H-acid has excellent fastness to light.

The dyes preferred in accordance with the invention are those containing ether groups in the central portion (—B—) of the molecule, especially those containing two ether groups in para position.

The preferred coupling components are the aminonaphthol sulfonic acids containing 1 or 2 sulfonic acid groups, particularly those derived

We claim:

1. A bluish azo dye of the general formula

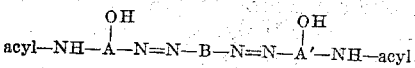

wherein B is an aromatic nucleus in which the azo bonds shown stand in 1,4 position, A and A' are naphthalene nuclei, the hydroxyl groups shown standing in ortho position to the azo groups shown, at least one of said naphthalene nuclei A and A' carrying from 1 to 2 —SO₃ cation radicals.

2. A bluish azo dye in accordance with claim 1 in which each of the acyl radicals shown are carboxylic acid acyl radicals.

3. A bluish azo dye in accordance with claim 1 in which each of the acyl radicals shown are sulfonic acid acyl radicals.

4. A bluish azo dye in accordance with claim 1 in which B is a benzene nucleus.

5. A bluish azo dye in accordance with claim 1 in which B is a benzene nucleus carrying at least one ether radical in at least one of the positions two and four of the benzene nucleus in which the ether oxygen is bound directly to the benzene nucleus.

6. A bluish azo dye of the general formula

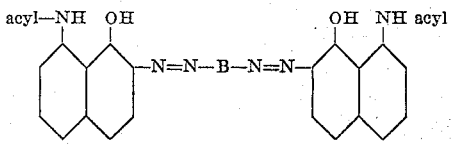

wherein B is a benzene nucleus in which the azo groups shown stand in 1,4 position, and wherein at least one of the naphthalene nuclei shown carries from 1 to 2 —SO₃ cation radicals.

7. A bluish azo dye in accordance with claim 6 in which B is a benzene nucleus carrying at least one ether radical in at least one of the positions 2 and 4 of the benzene nucleus in which the ether oxygen is bound directly to the benzene nucleus.

8. An azo dye of the formula

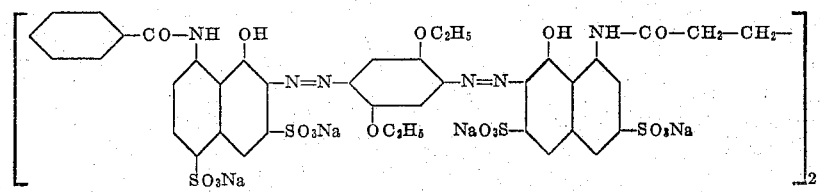

9. An azo dye of the formula

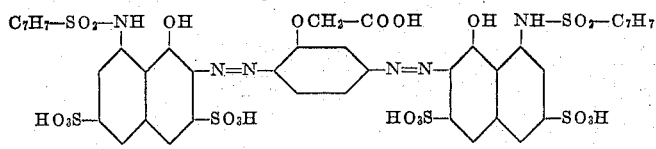

10. An azo dye of the formula

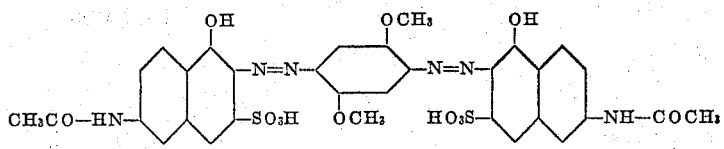

BELA GASPAR.
PAUL DANIEL DREYFUSS.

REFERENCES CITED

The following references are of record in the file of this patent:

UNITED STATES PATENTS

| Number | Name | Date |
| --- | --- | --- |
| 546,068 | Krecke et al. | Sept. 10, 1895 |
| 1,101,739 | Gunther et al. | June 30, 1914 |
| 1,150,675 | Gunther et al. | Aug. 17, 1915 |
| 1,663,950 | Neelmeier et al. | Mar. 27, 1928 |
| 1,699,427 | Fellmer | Jan. 15, 1929 |
| 2,125,625 | Delfs et al. | Aug. 2, 1938 |
| 2,424,066 | Straub et al. | July 15, 1947 |

FOREIGN PATENTS

| Number | Country | Date |
| --- | --- | --- |
| 14,576 | Great Britain | 1902 |
| 8,569 | Great Britain | 1914 |
| 514,353 | Great Britain | 1939 |
| 107,228 | Sweden | Apr. 27, 1943 |

OTHER REFERENCES

Cain et al.: "Synthetic Dyestuffs," 6th edition, 1923, page 57.